(12) United States Patent
Zhu

(10) Patent No.: US 10,847,122 B2
(45) Date of Patent: Nov. 24, 2020

(54) METHOD AND APPARATUS FOR UPDATING INFORMATION

(71) Applicant: Beijing Xiaomi Mobile Software Co., Ltd., Beijing (CN)

(72) Inventor: Shaoxiong Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 22 days.

(21) Appl. No.: 16/105,626

(22) Filed: Aug. 20, 2018

(65) Prior Publication Data

US 2019/0066633 A1 Feb. 28, 2019

(30) Foreign Application Priority Data

Aug. 22, 2017 (CN) .......................... 2017 1 0721939

(51) Int. Cl.
| | |
|---|---|
| *G09G 5/393* | (2006.01) |
| *G06F 1/3234* | (2019.01) |
| *G06F 3/14* | (2006.01) |
| *G09G 5/00* | (2006.01) |
| *G09G 5/36* | (2006.01) |

(52) U.S. Cl.
CPC .......... *G09G 5/393* (2013.01); *G06F 1/3262* (2013.01); *G06F 1/3265* (2013.01); *G06F 3/14* (2013.01); *G09G 5/00* (2013.01); *G09G 5/363* (2013.01); *G09G 2310/08* (2013.01);
(Continued)

(58) Field of Classification Search
None
See application file for complete search history.

(56) References Cited

U.S. PATENT DOCUMENTS

| | | | |
|---|---|---|---|
| 8,645,736 B1 * | 2/2014 | Tabone ................... | G06F 1/329 713/323 |
| 8,873,342 B1 * | 10/2014 | Boudreaux .............. | G04G 9/04 368/47 |

(Continued)

FOREIGN PATENT DOCUMENTS

| | | |
|---|---|---|
| CN | 102270428 A | 12/2011 |
| CN | 103838531 A | 6/2014 |

(Continued)

OTHER PUBLICATIONS

Extended European Search Report dated Dec. 20, 2018 in Patent Application No. 18190225.5, 47 pages.

(Continued)

*Primary Examiner* — Sultana M Zalalee
(74) *Attorney, Agent, or Firm* — Oblon, McClelland, Maier & Neustadt, L.L.P.

(57) ABSTRACT

The disclosure relates to a method and an apparatus for updating information. The method includes, in an Always On Display (AOD) mode, determining a target update information format corresponding to a type of a content to be updated, wherein the type of the content to be updated includes time and/or picture, and different update information formats correspond to different types of contents to be updated; generating, based on the content to be updated and the target update information format, update information corresponding to the content to be updated; and controlling a screen to update the content to be updated based on the update information and to display the updated content.

17 Claims, 10 Drawing Sheets

(52) U.S. Cl.
CPC . *G09G 2330/021* (2013.01); *G09G 2330/022* (2013.01); *G09G 2360/02* (2013.01); *G09G 2360/127* (2013.01)

(56) References Cited

U.S. PATENT DOCUMENTS

| | | | | |
|---|---|---|---|---|
| 9,058,370 | B2 * | 6/2015 | Garrett | G06F 16/258 |
| 9,411,319 | B1 | 8/2016 | Matsui | |
| 2003/0151982 | A1 * | 8/2003 | Brewer | G04G 21/00 368/46 |
| 2007/0297394 | A1 * | 12/2007 | Allan | H04M 7/006 370/356 |
| 2008/0256492 | A1 * | 10/2008 | Yamamoto | G06F 9/451 715/856 |
| 2008/0284795 | A1 * | 11/2008 | Ebert | G06F 3/0416 345/619 |
| 2012/0188262 | A1 * | 7/2012 | Rabii | G09G 5/393 345/534 |
| 2014/0035804 | A1 * | 2/2014 | Dearman | H04M 1/72544 345/156 |
| 2015/0185815 | A1 * | 7/2015 | DeBates | G06F 1/3209 713/320 |
| 2015/0206479 | A1 * | 7/2015 | Maeda | G09G 3/344 345/107 |
| 2015/0294627 | A1 * | 10/2015 | Yoo | G06F 3/147 345/690 |
| 2015/0302832 | A1 * | 10/2015 | Xie | G09G 5/363 345/520 |
| 2015/0325213 | A1 | 11/2015 | Lee et al. | |
| 2016/0049106 | A1 * | 2/2016 | Connell | G06F 3/3206 345/207 |
| 2016/0210371 | A1 * | 7/2016 | Akolkar | G06F 3/013 |
| 2016/0309307 | A1 | 10/2016 | Agarwal et al. | |
| 2016/0358311 | A1 * | 12/2016 | Chen | G06F 17/214 |
| 2017/0003757 | A1 * | 1/2017 | Gao | G06F 1/1615 |
| 2017/0098416 | A1 * | 4/2017 | Taylor | G09G 3/344 |
| 2017/0116908 | A1 * | 4/2017 | Li | G09G 3/3618 |
| 2017/0116915 | A1 * | 4/2017 | Song | G09G 3/20 |
| 2017/0236497 | A1 * | 8/2017 | Huitema | G09G 5/393 345/173 |
| 2017/0300016 | A1 * | 10/2017 | Lider | G04B 19/04 |
| 2018/0203500 | A1 * | 7/2018 | Kim | G06F 1/3287 |
| 2018/0248998 | A1 * | 8/2018 | Kim | H04M 1/72547 |
| 2019/0026063 | A1 * | 1/2019 | Mabey | G06F 3/1423 |
| 2019/0121482 | A1 * | 4/2019 | Lee | G06F 3/0488 |

FOREIGN PATENT DOCUMENTS

| | | |
|---|---|---|
| CN | 104954558 A | 9/2015 |
| CN | 105162945 A | 12/2015 |
| CN | 106547539 A | 3/2017 |
| CN | 106648025 A | 5/2017 |
| CN | 106648307 A | 5/2017 |

OTHER PUBLICATIONS

Combined Chinese Office Action and Search Report dated Nov. 4, 2019, in Patent Application No. 201710721939.0, 11 pages (with English Translation of Category of Cited Documents).

Third Chinese Office Action dated Sep. 14, 2020 in corresponding Chinese Patent Application No. 20170721939.0 (9 pages).

* cited by examiner

```
┌─────────────────────────────────────────────┐
│ PRIOR TO ENTERING THE AOD MODE, SENDING INITIAL │
│ INFORMATION TO THE DISPLAY MODULE, WHERE THE │
│ INITIAL INFORMATION INCLUDES INITIAL TIME AND │
│ CHARACTER BITMAP INFORMATION, SO THAT IN THE AOD │
│ MODE, THE DISPLAY MODULE, BASED ON THE CHARACTER │──104
│ BITMAP INFORMATION, THE INITIAL TIME AND A CLOCK │
│ FREQUENCY GENERATED BY A CRYSTAL OSCILLATOR IN │
│ THE DISPLAY MODULE, CONTROLS THE SCREEN TO │
│ UPDATE DISPLAYING OF THE CURRENTLY DISPLAYED │
│ TIME AT A SECOND TIME INTERVAL │
└─────────────────────────────────────────────┘
                      ↓
┌─────────────────────────────────────────────┐
│ IN THE AOD MODE, ACQUIRING CURRENT TIME BASED ON │
│ RTC AT A THIRD TIME INTERVAL, WHERE THE THIRD TIME │──101G
│ INTERVAL IS LARGER THAN THE SECOND TIME INTERVAL │
└─────────────────────────────────────────────┘
                      ↓
┌─────────────────────────────────────────────┐
│ DETERMINING THE CURRENT TIME AS THE CONTENT TO │──101H
│                 BE UPDATED                  │
└─────────────────────────────────────────────┘
                      ↓
┌─────────────────────────────────────────────┐
│ DETERMINING AN UPDATE INFORMATION FORMAT │
│ CORRESPONDING TO TIME AS THE TARGET UPDATE │──101I
│           INFORMATION FORMAT                │
└─────────────────────────────────────────────┘
                      ↓
┌─────────────────────────────────────────────┐
│ GENERATING, BASED ON THE CURRENT TIME AND THE │
│ TARGET UPDATE INFORMATION FORMAT, THE UPDATE │
│ INFORMATION, WHERE THE UPDATE INFORMATION │──102C
│ INCLUDES AT LEAST ONE OF TIME-DISPLAYING POSITION │
│ INFORMATION, TIME-DISPLAYING COLOR INFORMATION │
│        AND TIME FORMAT INFORMATION           │
└─────────────────────────────────────────────┘
                      ↓
┌─────────────────────────────────────────────┐
│ SENDING THE UPDATE INFORMATION TO THE DISPLAY │
│ MODULE, SO THAT THE DISPLAY MODULE, BASED ON THE │──103
│ UPDATE INFORMATION, CONTROLS THE SCREEN TO │
│ UPDATE DISPLAYING OF THE CURRENTLY DISPLAYED │
│                    TIME                     │
└─────────────────────────────────────────────┘
```

*FIG. 6*

METHOD AND APPARATUS FOR UPDATING INFORMATION

CROSS-REFERENCE TO RELATED APPLICATIONS

This application is based upon and claims priority to Chinese Patent Application No. 201710721939.0, filed on Aug. 22, 2017, the entire contents of which are incorporated herein by reference.

TECHNICAL FIELD

The present disclosure relates to the technical field of image displaying, and more particularly, to a method and an apparatus for updating information.

BACKGROUND

AOD (Always On Display) mode is a display mode in which specific contents are displayed on part of an entire screen without lighting the entire screen.

In the AOD mode, contents displayed on the screen generally include current time and notification icon. In order to ensure the accuracy of displayed contents, a processor in an electronic device has to send update information and an updating instruction to a display module at a predetermined time interval (e.g., every minute) via MIPI (Mobile Industry Processor Interface), so that the display module updates contents displayed on the entire screen area based on the update information.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

In order to solve the problem of high power consumption in the AOD mode (due to the fact that, in the AOD mode, the processor has to send update information corresponding to contents displayed on the entire screen area to the display module at a predetermined time intervals, i.e., a large amount of information needs to be sent), the present disclosure provides a method and an apparatus for updating information. The technical solutions are as follows.

Aspects of the disclosure provide a method for updating information. The method includes, in an Always On Display (AOD) mode, determining a target update information format corresponding to a type of a content to be updated, wherein the type of the content to be updated includes time and/or picture, and different update information formats correspond to different types of contents to be updated; generating, based on the content to be updated and the target update information format, update information corresponding to the content to be updated; and controlling a screen to update the content to be updated based on the update information and to display the updated content.

According to an aspect, when determining the target update information format corresponding to the type of the content to be updated, the method further includes acquiring a current time based on Real Time Clock (RTC) at a first time interval; determining the current time as the content to be updated; and determining an update information format corresponding to time as the target update information format.

In an example, when generating, based on the content to be updated and the target update information format, update information corresponding to the content to be updated, the method further includes generating, based on the current time and the target update information format, the update information, wherein the update information includes at least one of time-displaying position information, time-displaying color information, and time format information, so that the screen is controlled based on the update information to update a currently displayed time.

According to an aspect, when determining the target update information format corresponding to the type of the content to be updated, the method includes acquiring a prompting picture corresponding to a notification message when the notification message is received, wherein the notification message includes at least one of an incoming call notification message, a short message notification message, and an instant communication notification message; determining the prompting picture as the content to be updated; and determining an update information format corresponding to picture as the target update information format.

In an example, when generating, based on the content to be updated and the target update information format, update information corresponding to the content to be updated, the method includes generating, based on the prompting picture and the target update information format, the update information, wherein the update information includes at least one of picture-displaying position information, picture size information, and picture format information, so that the screen is controlled based on the update information to update a currently displayed picture.

According to an aspect, the method further includes, prior to entering the AOD mode, sending initial information to the display module, wherein the initial information includes an initial time and character bitmap information, and the character bitmap information includes at least one of a font size, a code, bitmap data, and a color corresponding to the character, so that in the AOD mode, the screen is controlled based on the character bitmap information, the initial time, and a clock frequency generated by a crystal oscillator in the display module, to update a currently displayed time at a second time interval.

In an example, when determining the target update information format corresponding to the type of the content to be updated, the method includes acquiring current time based on RTC at a third time interval, wherein the third time interval is larger than the second time interval; determining the current time as the content to be updated; and determining an update information format corresponding to time as the target update information format. Furthermore, when generating, based on the content to be updated and the target update information format, update information corresponding to the content to be updated, the method further includes generating, based on the current time and the target update information format, the update information, wherein the update information includes at least one of time-displaying position information, time-displaying color information, and time format information, so that the screen is controlled based on the update information to update a currently displayed time.

According to an aspect, the method further includes, in the AOD mode, controlling the screen to adjust, based on an adjusting instruction at a fourth time interval, a display position of a currently displayed content.

Aspects of the disclosure also provide an apparatus for updating information. The apparatus includes a processor and a memory for storing instructions executable by the processor. The processor is configured to, in an Always On Display (AOD) mode, determine a target update information format corresponding to a type of a content to be updated, wherein the type of the content to be updated includes time and/or picture, and different update information formats correspond to different types of contents to be updated; generate, based on the content to be updated and the target update information format, update information corresponding to the content to be updated; and control a screen to update the content to be updated based on the update information and to display the updated content.

Aspects of the disclosure also provide a non-transitory computer-readable medium storing instructions that, when executed by one or more processors of a computing device, cause the computing device to: in an Always On Display (AOD) mode, determine a target update information format corresponding to a type of a content to be updated, wherein the type of the content to be updated includes time and/or picture, and different update information formats correspond to different types of contents to be updated; generate, based on the content to be updated and the target update information format, update information corresponding to the content to be updated; and control a screen to update the content to be updated based on the update information and to display the updated content.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

FIG. 6 is a flow chart illustrating a method for updating information according to another exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

In an AOD mode, the screen of a terminal displays thereon few contents containing generally time and notification icon. The displayed time is updated at a predetermined time period (e.g., one minute), whereas the displayed notification icon is updated only when a notification message is received. Moreover, in the prior art, when controlling a display module to update the contents displayed on the screen based on existing commands in the MIPI DCS (Display Command Set), the processor of the terminal has to fully update contents displayed on the entire screen area. Thus, the amount of the update information (including information corresponding to both time and notification icon) to be sent by the processor is large, resulting in high power consumption of the terminal in the AOD mode.

In order to solve the above problem, in the aspects of the present disclosure, the terminal determines, before updating a displayed content, an update information format corresponding to a type of the content to be updated; generates, based on the update information format and the content to be updated, update information; and sends the update information to a display module, so that the display module only updates the content to be updated. In this way, the amount of the information to be sent is reduced, and the power consumption of the terminal in the AOD mode is lowered. Detailed description will be given below with reference to exemplary aspects.

Methods for updating information according to aspects of the present disclosure are implemented by a terminal. The terminal may be an electronic device including a display module, such as a smart phone, a tablet computer, an e-book reader, a portable personal computer. For facilitating description, the following aspects will be described by taking a case, where the method for updating information is applied to the terminal, as example.

Figure 1:
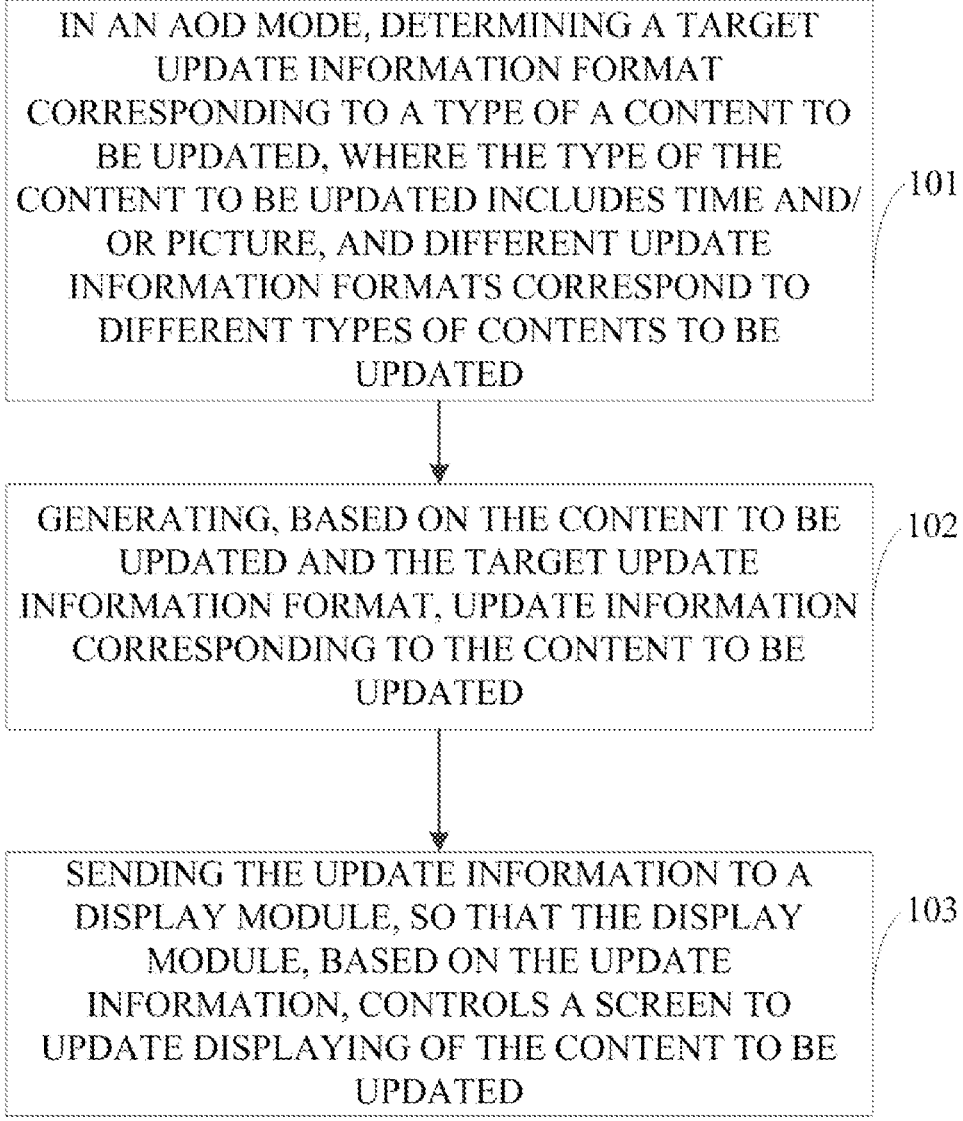
FIG. 1 is a flow chart illustrating a method for updating information according to an exemplary aspect of the present disclosure.

FIG. 1 is a flow chart illustrating a method for updating information according to an exemplary aspect of the present disclosure. In the present aspect, the case where the method for updating information is applied to the terminal is taken as the example. The method for updating information includes the following steps.

Step 101: in an AOD mode, determining a target update information format corresponding to a type of a content to be updated. The type of the content to be updated includes time and/or picture, and different update information formats correspond to different types of contents to be updated.

In a possible implementation, a mapping relationship between the type of content to be updated and the update information format may be predefined in the terminal. The update information format indicates an instruction format for update information. Different instruction formats for update information correspond to different types of contents to be updated.

In the AOD mode, when needing to update the currently displayed content on the screen, the terminal first determines, based on the type of content to be updated and the aforesaid mapping relationship, the target update information format corresponding to the type of content to be updated.

Optionally, in order to ensure the accuracy of time displayed on the screen in the AOD mode, the terminal may update the time displayed on the screen at a predetermined time interval (e.g., every minute). Accordingly, the terminal determines an update information format corresponding to time as the target update information format at a predetermined time interval, so that the terminal subsequently generates, based on the target update information format, update information for updating the time.

Optionally, in order to prompt a user that a new notification message is received, the terminal determines, after receiving the notification message, an update information format corresponding to picture as the target update information format, so that the terminal subsequently generates, based on the target update information format, update information for updating the prompting picture.

Step 102: generating, based on the content to be updated and the target update information format, update information corresponding to the content to be updated.

Further, the terminal generates update information conforming to the target update information format based on the content to be updated. For example, when the content to be updated is time, the terminal generates, based on the current time and the update information format corresponding to time, update information; and when the content to be updated is a prompting picture, the terminal generates, based on the prompting picture and the update information format corresponding to picture, update information.

Step 103: sending the update information to a display module, so that the display module, based on the update information, controls a screen to update displaying of the content to be updated.

The display module consists of a display screen and an IC (Integrated Circuit) chip. The IC chip is connected to the processor of the terminal, and controls, based on instructions from the processor, the screen to display an image. Optionally, the display module is a LCDM (Liquid Crystal Display Module).

After generating update information corresponding to the content to be updated, the processor of the terminal sends the update information to the IC chip of the display module. The IC chip, based on the update information, controls the screen to update a designated content to be updated.

In the prior art, the entire screen area of displayed contents has to be updated every time. In contrast, in the present aspect, the mapping relationship between the type of content to be updated and the update information format are predefined, so that the terminal may, based on the mapping relationship, only generate update information corresponding to the content to be updated, without having to generate update information corresponding to the content not to be updated. In this way, the amount of the update information is reduced, and the updating workload of the display module is mitigated.

In practical application scenarios, in case no notification message is received, the processor of the terminal just needs to send update information corresponding to time to the display module every minute. Accordingly, the display module just needs to update the currently displayed time based on the update information, without having to update other displayed contents (e.g., icons). In this way, the amount of information transmission is greatly reduced, and the effect of lowering the power consumption of the terminal in the AOD mode is achieved.

From the above, in the present aspect, in the AOD mode, the target update information format is determined first based on the type of content to be updated, and then update information is generated based on the target update information format and the content to be updated and is sent to the display module so that the display module only updates the content to be updated based on the update information. Compared with the prior art in which update information corresponding to entire screen area of contents is sent to the display module, aspects of the present disclosure need only sending, to the display module, update information corresponding to contents to be updated, thereby reducing the amount of the information to be sent, and lowering the power consumption of the terminal in the AOD mode.

Figure 2:
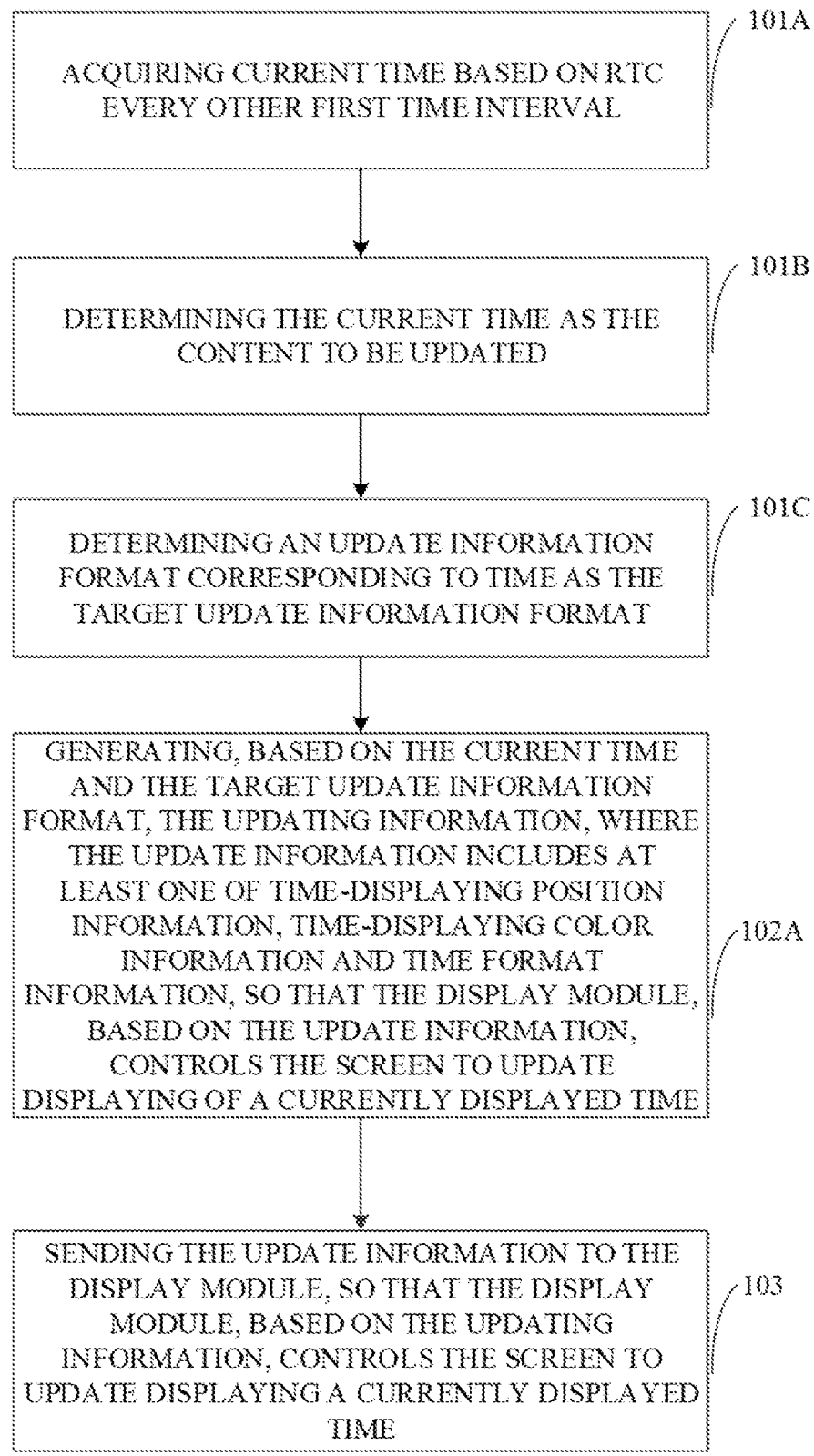
FIG. 2 is a flow chart illustrating a method for updating information according to another exemplary aspect of the present disclosure.

For updating the displayed time in the AOD mode and on the basis of the method for updating information as shown in FIG. 1, the above step 101 may be replaced with steps 101A to 101C, and step 102 may be replaced with step 102A, as shown in FIG. 2.

Step 101A: acquiring a current time based on RTC at a first time interval.

In a possible implementation, the processor of the terminal wakes up at a first time interval, and acquires the current time based on RTC. In order to ensure the accuracy of the displayed time, the first time interval may be set to one minute.

For example, the current time acquired by the processor of the terminal is 13:00.

Step 101B: determining the current time as the content to be updated.

Accordingly, the terminal determines the acquired current time as the content to be updated.

Step 101C: determining an update information format corresponding to time as the target update information format.

When time is updated, the display position, the display color, the display numerical value, the display format and the time period of the time are generally updated. Thus, the update information format corresponding to time includes the expressive formats of time-displaying position, time-displaying color, current time, time format and time period.

In a possible implementation, the target update information format is expressed by "TypeID+content", where TypeID is expressed in hexadecimal format to distinguish between different time-displaying parameters. As an exemplary example, the correspondence relationship between the TypeID and the time-displaying parameter is shown in table 1.

TABLE 1

| TypeID | Time-Displaying Parameter |
| --- | --- |
| 0x10 | Time-displaying position (x, y) |
| 0x11 | Time-displaying color (index) |

TABLE 1-continued

| TypeID | Time-Displaying Parameter |
|---|---|
| 0x12 | Current time (h, m) |
| 0x13 | Time format (24 hs, 12 hs) |
| 0x14 | Time period (AM, PM) |

When update information includes 0x10, contents following 0x10 indicate the time-displaying position which is expressed by coordinates (taking the fixed point at the top left of the screen as the origin of coordinates). When update information includes 0x11, contents following 0x11 indicate the time-displaying color which is expressed by color index (hexadecimal). When update information includes 0x12, contents following 0x12 indicate the current time which is expressed by hour and minute (hexadecimal). When update information includes 0x13, contents following 0x13 indicate the time format which includes 24-hour format (corresponding to 0x00) and 12-hour format (corresponding to 0x01). When update information includes 0x14, contents following 0x14 indicate the time period of the current time, the time period including AM (ante meridiem, corresponding to 0x00) and PM (post meridiem, corresponding to 0x01).

Step 102A: generating, based on the current time and the target update information format, the update information. The update information includes at least one of time-displaying position information, time-displaying color information and time format information.

Further, the processor of the terminal generates, based on the current time and the target update information format acquired at above step 101A, corresponding update information.

In combination with table 1, when the currently displayed time needs to be updated to 13:00 and the 12-hour format is employed to express it, update information is generated as shown in table 2.

TABLE 2

| TypeID | Content |
|---|---|
| 0x10 | (100, 500) |
| 0x11 | 0x00 |
| 0x12 | 0x01, 0x00 |
| 0x13 | 0x01 |
| 0x14 | 0x01 |

The above update information indicates that the updated time has the display coordinates of (100,500), the display color of white, the current time of 1:00, the time format of 12-hour format and the time period of PM.

Step 103: sending the update information to the display module, so that the display module, based on the update information, controls the screen to update displaying of a currently displayed time.

After the processor of the terminal sends the generated update information to the display module, the IC chip of the display module identifies different time-displaying parameters by means of TypeID, and thus updates the time based on contents following respective TypeIDs.

Figure 3:
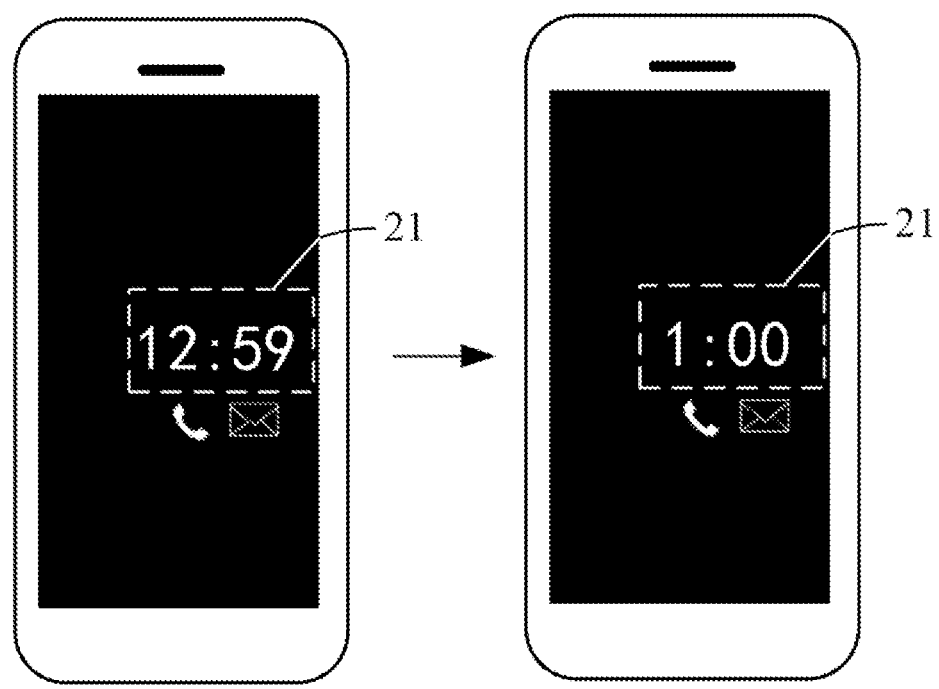
FIG. 3 is a schematic diagram of updating, by a terminal, a currently displayed time based on update information.

As an exemplary example, as shown in FIG. 3, in the AOD mode, when the time becomes from 12:59 to 13:00, the terminal updates the currently displayed time 21 on the screen based on the received update information.

Figure 4:
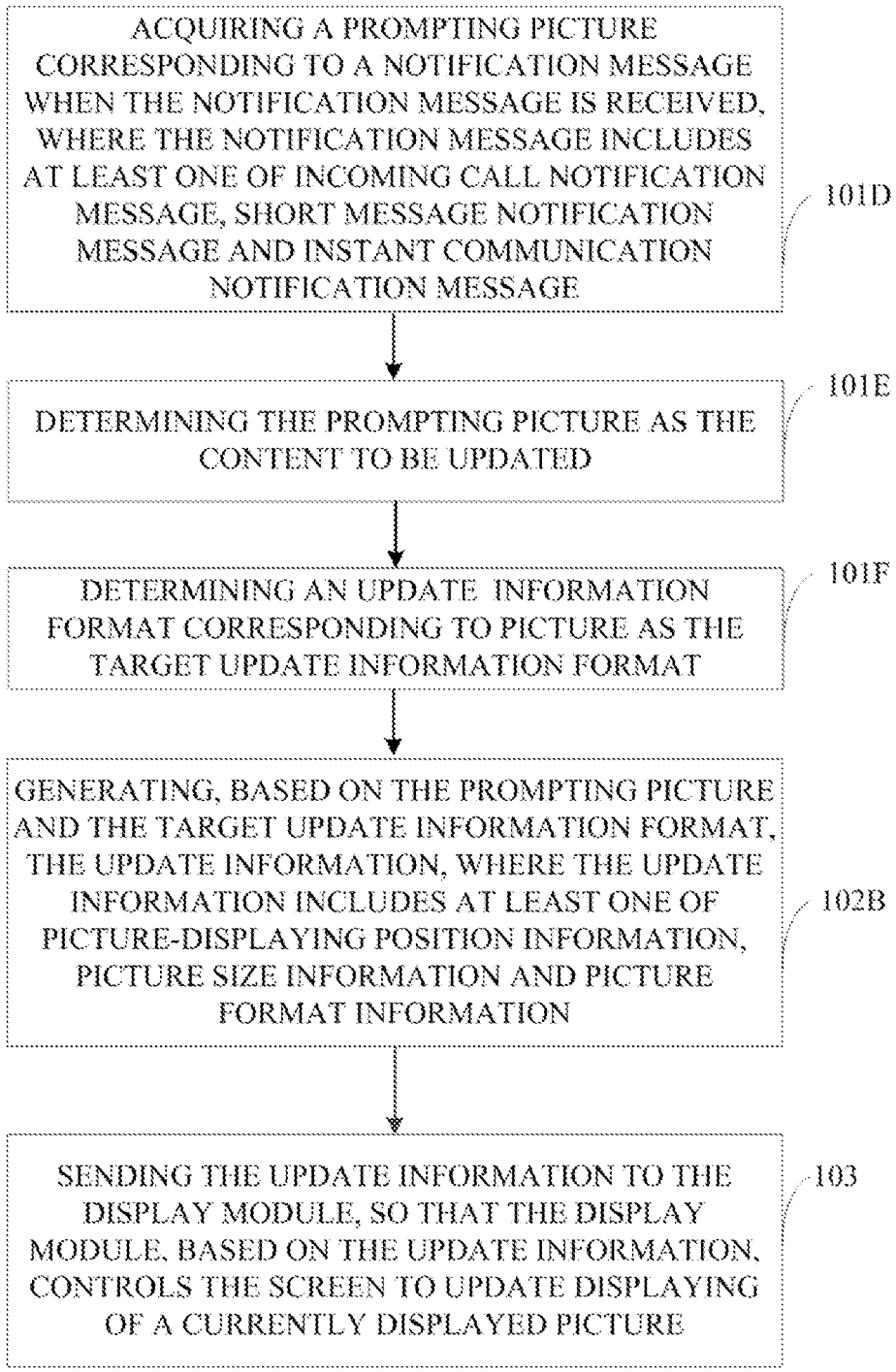
FIG. 4 is a flow chart illustrating a method for updating information according to another exemplary aspect of the present disclosure.

For updating the displayed picture in the AOD mode and on the basis of the method for updating information as shown in FIG. 1, the above step 101 may be replaced with steps 101D to 101F, and step 102 may be replaced with step 102B, as shown in FIG. 4.

Step 101D: acquiring a prompting picture corresponding to a notification message when the notification message is received. The notification message includes at least one of an incoming call notification message, a short message notification message and an instant communication notification message.

In the AOD mode, the picture displayed on the screen typically remains the same, and changes only when a particular trigger event is received.

Figure 5:
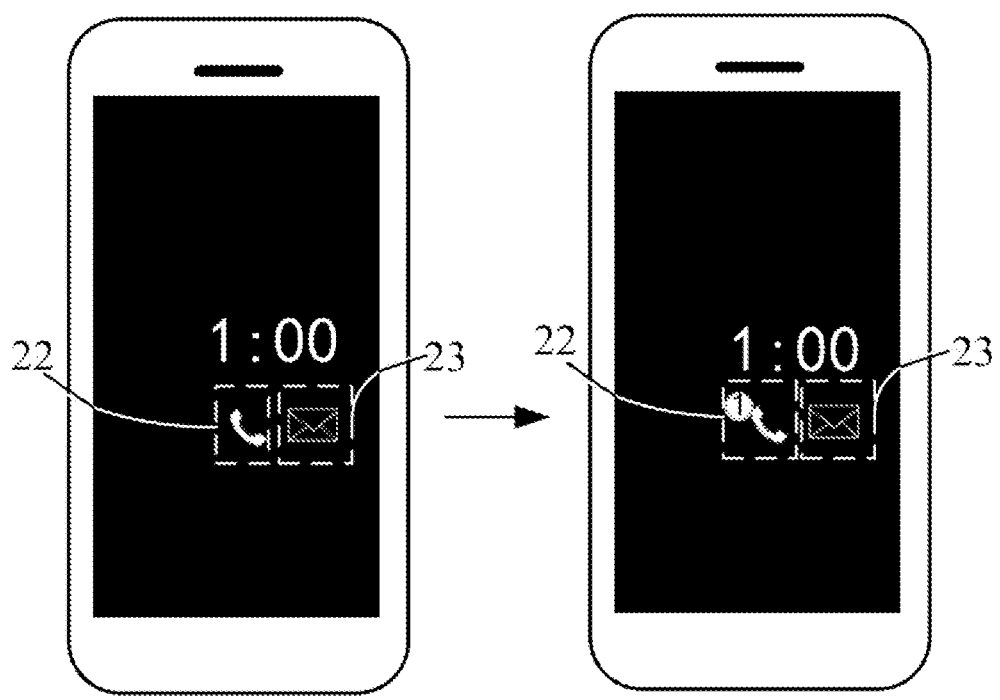
FIG. 5 is a schematic diagram of updating, by a terminal, a currently displayed picture based on update information.

As an exemplary example, as shown in FIG. 5, a call icon 22 and a short message icon 23 are displayed in the screen, and remain the same when no incoming call or short message is received.

In a possible implementation, when receiving a notification message, the terminal determines to update displaying of an icon corresponding to the notification message, and further acquires the prompting picture corresponding to the notification message. For example, when the received notification message is an incoming call message, the terminal acquires an incoming call notification icon; when the received notification message is a short message notification message, the terminal acquires a short message notification icon; and when the received notification message is an instant communication notification message, the terminal acquires an instant communication notification icon.

Step 101E: determining the prompting picture as the content to be updated.

Similar to the above step 101B, the terminal determines the acquired prompting picture as the content to be updated. For example, when receiving an incoming call notification message, the terminal determines the incoming call notification icon as the content to be updated.

Step 101F: determining an update information format corresponding to picture as the target update information format.

When the picture is updated, the display position, the size and the format of the picture are generally updated. Thus, the update information format corresponding to picture includes the expressive formats of picture-displaying position, picture size and picture format.

In a possible implementation, the target update information format is expressed by "TypeID+content", where TypeID is expressed in hexadecimal format to distinguish between different picture-displaying parameters. As an exemplary example, the correspondence relationship between the TypeID and the picture-displaying parameter is shown in table 3.

TABLE 3

| TypeID | Picture-Displaying Parameter |
|---|---|
| 0x20 | Picture-displaying position (x, y) |
| 0x21 | Picture-displaying size (w, h) |
| 0x22 | Picture format |
| 0x23 | Picture data |

When update information includes 0x20, contents following 0x20 indicate the picture-displaying position which is expressed by coordinates (taking the fixed point at the top left of the screen as the origin of coordinates). When update information includes 0x21, contents following 0x21 indicate the picture-displaying size which is expressed by w (width) and h (height). When update information includes 0x22, contents following 0x22 indicate the picture format. When update information includes 0x23, contents following 0x23 are the picture data.

Step 102B: generating, based on the prompting picture and the target update information format, the update information. The update information includes at least one of picture-displaying position information, picture size information and picture format information.

Further, the processor of the terminal generates, based on the prompting picture and the target update information format acquired at above step 101D, corresponding update information.

In combination with table 3, when needing to update the incoming call notification icon, update information is generated as shown in table 4.

TABLE 4

| TypeID | Content |
|---|---|
| 0x20 | (150, 600) |
| 0x21 | (50, 50) |
| 0x22 | 0x01 (RGB565) |
| 0x23 | RGB data |

The above update information indicates that the updated picture has the display coordinates of (150,600), the picture size of 50 px×50 px and the picture format of RGB565.

Step 103: sending the update information to the display module, so that the display module, based on the update information, controls the screen to update displaying of a currently displayed picture.

After the processor of the terminal sends the generated update information to the display module, the IC chip of the display module identifies different picture-displaying parameters by means of TypeID, and thus updates the picture based on contents following respective TypeIDs.

As an exemplary example, as shown in FIG. 5, in the AOD mode, when receiving an incoming call, the terminal, based on the generated update information, only updates the call icon 22 currently displayed on the screen, without updating the short message icon 23.

In the above aspects, the display module updates the content only when receiving update information. Thus, in order to ensure the accuracy of the displayed time in the AOD mode, the processor of the terminal has to wake up every minute and send the update information to the display module. However, frequent waking up of the processor may consume a large amount of power. In order to further lower the power consumption of the terminal in the AOD mode, the method in a possible implementation may, on the basis of FIG. 1, include the following steps as shown in FIG. 6.

Step 104: prior to entering the AOD mode, sending initial information to the display module. The initial information includes initial time and character bitmap information, so that in the AOD mode, the display module, based on the character bitmap information, the initial time and a clock frequency generated by a crystal oscillator in the display module, controls the screen to update displaying of a currently displayed time at a second time interval.

In the present aspect, a crystal oscillator is provided in the display module, and the IC chip of the display module is capable of self-clocking based on the clock frequency generated by the crystal oscillator. Thus, prior to entering the AOD mode, the processor of the terminal sends the initial information including an initial time and character bitmap information to the display module, so that the display module, on the basis of the initial time, automatically updates the time based on the clock frequency generated by the crystal oscillator. Further, the display module, on the basis of the character bitmap information, displays the updated time on the screen at a second time interval. For example, the display module automatically updates the displayed time every minute.

In a possible implementation, the character bitmap information is expressed by "TypeID+content", where TypeID is expressed in hexadecimal format to distinguish between different bitmap-displaying parameters. As an exemplary example, the correspondence relationship between the TypeID and the bitmap-displaying parameter is shown in table 5.

TABLE 5

| TypeID | Bitmap-Displaying Parameter |
|---|---|
| 0x00 | Character font size |
| 0x01 | Character code |
| 0x02 | Character bitmap data |
| 0x03 | Character color |

In a possible implementation, the processor of the terminal sends the character bitmap information corresponding to English letters and numbers to the display module, because time is displayed generally by means of a combination of letter and number.

Accordingly, the above step 101 may be replaced with steps 101G to 101I, and step 102 may be replaced with step 102C.

Step 101G: in the AOD mode, acquiring a current time based on RTC at a third time interval. The third time interval is larger than the second time interval.

There exists a certain error, in the case where the display module automatically updates the displayed time based on the clock frequency generated by the crystal oscillator. In order to correct the error and thus improve the accuracy of the displayed time, in a possible implementation, the processor of the terminal wakes up at a third time interval, and acquires the current time based on the RTC thereby generating corresponding update information based on the current time, so that the display module corrects the currently displayed time based on the update information. The third time interval is larger than the second time interval.

As an exemplary example, the display module automatically updates the displayed time every minute, whereas the processor wakes up every 30 minutes so as to generate update information based on the current time (i.e., the processor corrects the time displayed by the display module, every 30 minutes).

Step 101H: determining the current time as the content to be updated.

Step 101I: determining an update information format corresponding to time as the target update information format.

The implementations of the above steps 101H to 101I are similar to those of steps 101B to 101C, and will not be repeated in the present aspect.

Step 102C: generating, based on the current time and the target update information format, the update information. The update information includes at least one of time-displaying position information, time-displaying color information and time format information.

The implementation of the present step is similar to that of the above step 102A, and will not be repeated here.

Step 103: sending the update information to the display module, so that the display module, based on the update information, controls the screen to update displaying of a currently displayed time.

After receiving the update information, the display module corrects the currently displayed time based on the update information.

In the present aspect, prior to the AOD mode, an initial information including initial time and character bitmap information is sent to the display module, such that in the AOD mode, the display module may, based on the initial information and a clock frequency generated by a crystal oscillator in the display module, automatically update the time displayed on the screen, thereby further reducing the power consumption of the terminal. Meanwhile, the display module corrects the displayed time at a predetermined time interval, thereby improving the accuracy of the displayed time.

Figure 7:
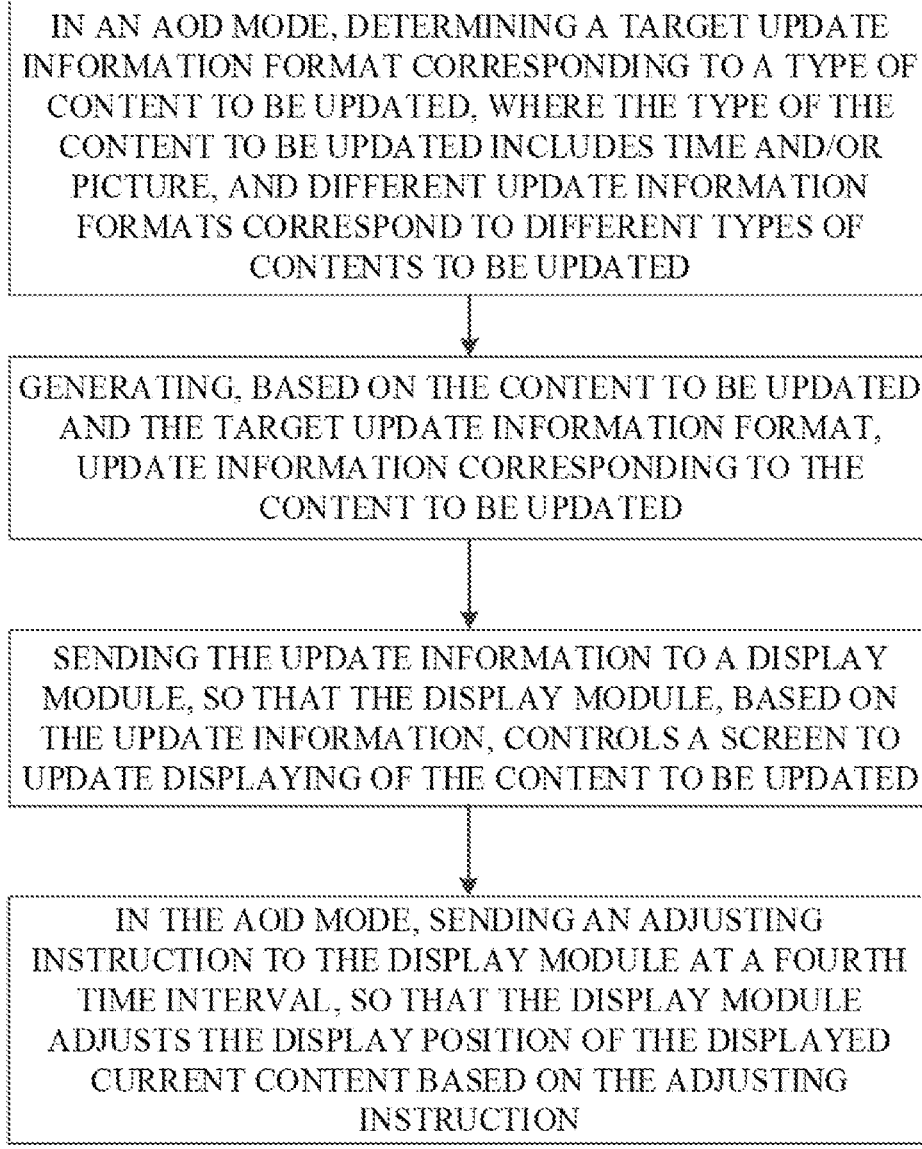
FIG. 7 is a flow chart illustrating a method for updating information according to another exemplary aspect of the present disclosure.

In order to avoid the adverse effect on the screen due to displaying contents on partial display area for a long time in the AOD mode, the method may, on the basis of FIG. 1, further include the following steps subsequent to step 103, as shown in FIG. 7.

Step 105: in the AOD mode, sending an adjusting instruction to the display module at a fourth time interval, so that the display module adjusts a display position of a currently displayed content based on the adjusting instruction.

In the AOD mode, the liquid crystal module at the position of the screen where contents are displayed is always lighted. In order to avoid burning out of the screen which may happen if the lighting state lasts a long time, it is necessary to adjust the position of the screen where contents are displayed.

In a possible implementation, the processor sends the adjusting instruction to the display module at a fourth time interval (e.g., 2 hours), so as to instruct the display module to adjust the position of the content currently displayed on the screen. The adjusting instruction contains target coordinates, and thus the display module moves the displayed content to a position located at the target coordinates based on the adjusting instruction.

Figure 8:
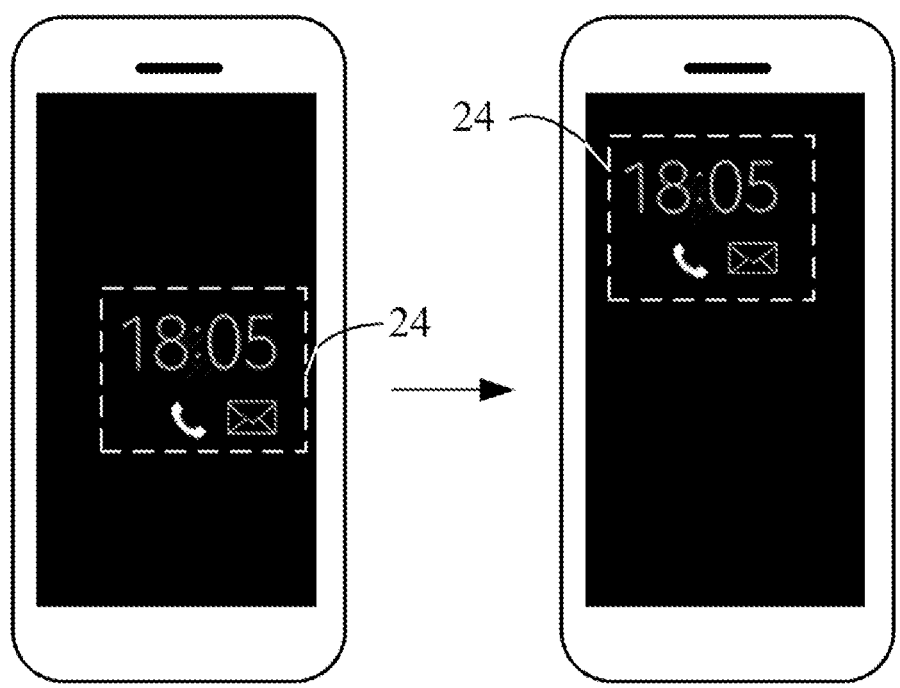
FIG. 8 is a schematic diagram of adjusting, by a terminal, the display position of a displayed content based on an adjusting instruction.

As an exemplary example, as shown in FIG. 8, the display module adjusts the display position of the displayed content 24 (containing time and icons) based on the adjusting instruction.

Hereinafter, the apparatus aspects of the present disclosure will be described, and may implement the method aspects of the present disclosure. For details not disclosed in the apparatus aspects of the present disclosure, please refer to the method aspects of the present disclosure.

Figure 9:
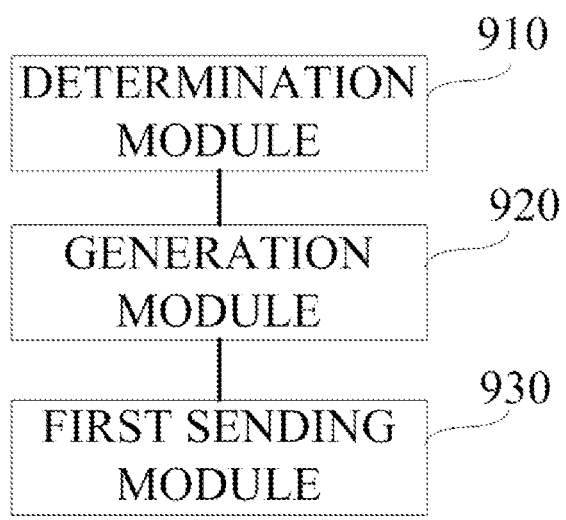
FIG. 9 is a schematic diagram illustrating a structure of an apparatus for updating information according to an exemplary aspect of the present disclosure.

FIG. 9 is a schematic diagram illustrating a structure of an apparatus for updating information according to an exemplary aspect of the present disclosure. With reference to FIG. 9, the apparatus may be embodied as the whole or a part of a terminal through software, hardware or both. The apparatus includes the following modules.

A determination module 910 is configured to, in an AOD mode, determine a target update information format corresponding to a type of a content to be updated. The type of the content to be updated includes time and/or picture, and different update information formats correspond to different types of contents to be updated.

A generation module 920 is configured to generate, based on the content to be updated and the target update information format, update information corresponding to the content to be updated A first sending module 930 is configured to send the update information to a display module, so that the display module, based on the update information, controls a screen to update displaying of the content to be updated.

Optionally, the determination module 910 includes: a first acquisition unit configured to acquire a current time based on RTC at a first time interval; a first determination unit configured to determine the current time as the content to be updated; and a second determination unit configured to determine an update information format corresponding to time as the target update information format.

Optionally, the generation module 920 is further configured to generate, based on the current time and the target update information format, the update information. The update information includes at least one of time-displaying position information, time-displaying color information and time format information, so that the display module, based on the update information, controls the screen to update displaying of a currently displayed time.

Optionally, the determination module 910 includes: a second acquisition unit configured to acquire a prompting picture corresponding to a notification message when the notification message is received, where the notification message includes at least one of an incoming call notification message, a short message notification message and an instant communication notification message; a third determination unit configured to determine the prompting picture as the content to be updated; and a fourth determination unit configured to determine an update information format corresponding to picture as the target update information format.

Optionally, the generation module 920 is further configured to generate, based on the prompting picture and the target update information format, the update information. The update information includes at least one of picture-displaying position information, picture size information and picture format information, so that the display module, based on the update information, controls the screen to update displaying of a currently displayed picture.

Optionally, the apparatus further includes: a second sending module configured to, prior to entering the AOD mode, send initial information to the display module. The initial information includes an initial time and character bitmap information, and the character bitmap information includes at least one of a font size, a code, bitmap data and a color corresponding to the character, so that in the AOD mode, the display module, based on the character bitmap information, the initial time and a clock frequency generated by a crystal oscillator in the display module, controls the screen to update displaying of a currently displayed time at a second time interval.

Optionally, the determination module 910 includes: a third acquisition unit configured to acquire current time based on RTC at a third time interval, where the third time interval is larger than the second time interval; a fifth determination unit configured to determine the current time as the content to be updated; and a sixth determination unit configured to determine an update information format corresponding to time as the target update information format. The generation module is further configured to generate, based on the current time and the target update information format, the update information. The update information includes at least one of time-displaying position information, time-displaying color information and time format information, so that the display module, based on the update information, controls the screen to update displaying of a currently displayed time.

Optionally, the apparatus further includes: a third sending module configured to, in the AOD mode, send an adjusting instruction to the display module at a fourth time interval, so that the display module adjusts a display position of a currently displayed content based on the adjusting instruction.

From the above, in the present aspect, in the AOD mode, the target update information format is determined first based on the type of content to be updated, and then update information is generated based on the target update information format and the content to be updated and is sent to the display module so that the display module only updates the content to be updated based on the update information. Compared with the prior art in which update information corresponding to entire screen area of contents is sent to the display module, aspects of the present disclosure need only sending, to the display module, update information corresponding to contents to be updated, thereby reducing the amount of the information to be sent, and lowering the power consumption of the terminal in the AOD mode.

Figure 10:
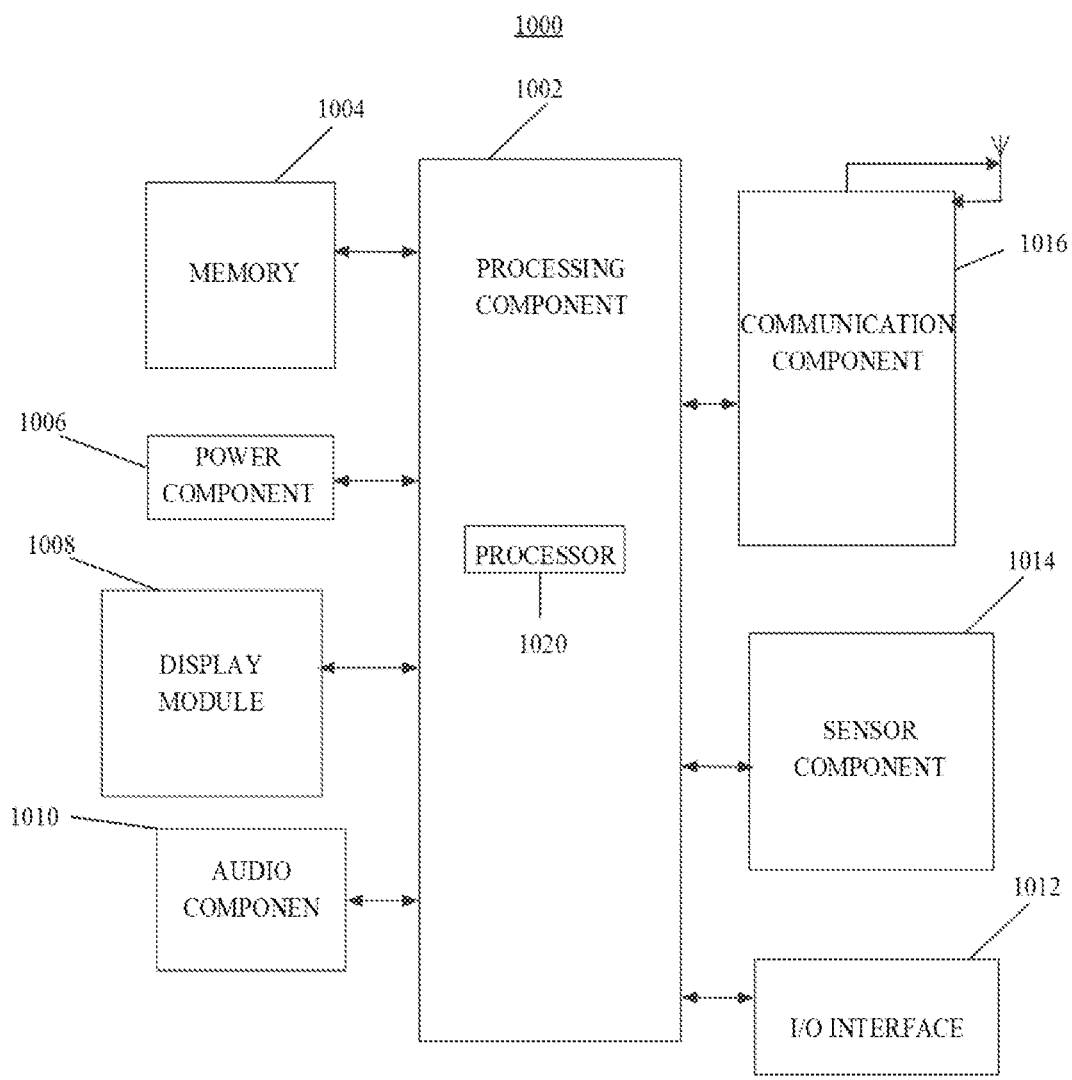
FIG. 10 is a block diagram illustrating a terminal according to an exemplary aspect.

FIG. 10 is a block diagram illustrating a terminal 1000 according to an exemplary aspect.

Referring to FIG. 10, the apparatus 1000 may include one or more of the following components: a processing component 1002, a memory 1004, a power component 1006, a display module 1008, an audio component 1010, an input/output (I/O) interface 1012, a sensor component 1014, and a communication component 1016.

The processing component 1002 typically controls overall operations of the apparatus 1000, such as the operations associated with display, phone calls, data communications, camera operations and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For example, the processing component 1002 may include a multimedia module to facilitate the interaction between the display module 1008 and the processing component 1002.

The memory 1004 is configured to store various types of data to support operations of the apparatus 1000. Examples of such data include instructions for any applications or methods operated on the apparatus 1000, contact data, phonebook data, messages, pictures, video, etc. The memory 1004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power supply management system, one or more power sources, and any other components associated with the generation, management, and distribution of power in the apparatus 1000.

The display module 1008 includes a screen providing an output interface between the apparatus 1000 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some aspects, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button. In the present aspect, the I/O interface 1012 may be physical keys provided at front side or periphery of the terminal. A fingerprint identification module for sampling the user's fingerprints is provided in the physical keys. Also, the I/O interface 1012 may be a fingerprint identification zone provided at back side of the terminal. The fingerprint identification module is included in the fingerprint identification zone.

The sensor component 1014 includes one or more sensors to provide status assessments of various aspects of the apparatus 1000. For instance, the sensor component 1014 may detect an open/closed status of the apparatus 1000, relative positioning of components, e.g., the display and the keypad, of the apparatus 1000, a change in position of the apparatus 1000 or a component of the apparatus 1000, a presence or absence of user's contact with the apparatus 1000, an orientation or an acceleration/deceleration of the apparatus 1000, and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In present aspect, the sensor component 1014 may also include an accelerometer sensor and an angular velocity sensor for sampling the acceleration data and the angular velocity data of the terminal, respectively.

The communication component 1016 is configured to facilitate communication, wired or wirelessly, between the apparatus 1000 and other devices. The apparatus 1000 can access a wireless network based on a communication standard, such as WiFi, 2G, or 3G, or a combination thereof. In one exemplary aspect, the communication component 1016 receives a broadcast signal or broadcast associated information from an external broadcast management system via a broadcast channel. In one exemplary aspect, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods for updating information.

In an exemplary aspect, there is also provided a computer-readable medium including instructions, such as included in the memory 1004, executable by the processor 1020 in the apparatus 1000, for performing the above-described methods for updating information. For example, the computer-readable medium may be a ROM, a RAM, a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for updating information, comprising:
   in an Always On Display (AOD) mode, determining a target update information format corresponding to a type of a content to be updated, wherein the type of the content to be updated includes time and/or picture, and different update information formats correspond to different types of contents to be updated, wherein the update information format corresponding to the time includes expressive formats of time-displaying position, time-displaying color, current time, time format, and time period, and wherein the update information format corresponding to the picture includes expressive formats of picture-displaying position, picture size, and picture format;
   generating, based on a predefined mapping relationship between the type content to be updated and the target update information format, only update information corresponding to the content to be updated; and
   controlling a screen to update the content to be updated based on the update information and to display the updated content while maintaining a display of unchanged contents.

2. The method of claim 1, wherein determining the target update information format corresponding to the type of the content to be updated comprises:
   acquiring a current time based on Real Time Clock (RTC) at a first time interval;
   determining the current time as the content to be updated; and
   determining an update information format corresponding to time as the target update information format.

3. The method of claim 2, wherein generating, based on the content to be updated and the target update information format, update information corresponding to the content to be updated comprises:
   generating, based on the current time and the target update information format, the update information, wherein the update information includes at least one of time-displaying position information, time-displaying color information, and time format information, so that the screen is controlled based on the update information to update a currently displayed time.

4. The method of claim 1, wherein determining the target update information format corresponding to the type of the content to be updated comprises:
   acquiring a prompting picture corresponding to a notification message when the notification message is received, wherein the notification message includes at least one of an incoming call notification message, a short message notification message, and an instant communication notification message;
   determining the prompting picture as the content to be updated; and
   determining an update information format corresponding to picture as the target update information format.

5. The method of claim 4, wherein generating, based on the content to be updated and the target update information format, update information corresponding to the content to be updated comprises:
   generating, based on the prompting picture and the target update information format, the update information, wherein the update information includes at least one of picture-displaying position information, picture size information, and picture format information, so that the screen is controlled based on the update information to update a currently displayed picture.

6. The method of claim 1, further comprising:
   prior to entering the AOD mode, sending initial information to a display module, wherein the initial information includes an initial time and character bitmap information, and the character bitmap information includes at least one of a font size, a code, bitmap data, and a color corresponding to the character, so that in the AOD mode, the screen is controlled based on the character bitmap information, the initial time, and a clock frequency generated by a crystal oscillator in the display module, to update a currently displayed time at a second time interval.

7. The method of claim 6, wherein determining the target update information format corresponding to the type of the content to be updated comprises:
   acquiring current time based on RTC at a third time interval, wherein the third time interval is larger than the second time interval;
   determining the current time as the content to be updated; and
   determining an update information format corresponding to time as the target update information format,
   wherein generating, based on the content to be updated and the target update information format, update information corresponding to the content to be updated comprises:
   generating, based on the current time and the target update information format, the update information, wherein the update information includes at least one of time-displaying position information, time-displaying color information, and time format information, so that the screen is controlled based on the update information to update a currently displayed time.

8. The method of claim 1, further comprising:
in the AOD mode, controlling the screen to adjust, based on an adjusting instruction at a fourth time interval, a display position of a currently displayed content.

9. An apparatus for updating information, comprising:
a processor; and
a memory for storing instructions executable by the processor,
wherein the processor is configured to:
in an Always On Display (AOD) mode, determine a target update information format corresponding to a type of a content to be updated, wherein the type of the content to be updated includes time and/or picture, and different update information formats correspond to different types of contents to be updated, wherein the update information format corresponding to the time includes expressive formats of time-displaying position, time-displaying color, current time, time format, and time period, and wherein the update information format corresponding to the picture includes expressive formats of picture-displaying position, picture size, and picture format;
generate, based on a predefined mapping relationship between the type content to be updated and the target update information format, only update information corresponding to the content to be updated; and
control a screen to update the content to be updated based on the update information and to display the updated content while maintaining a display of unchanged contents.

10. The apparatus of claim 9, wherein the processor is further configured such that determining the target update information format corresponding to the type of the content to be updated comprises:
acquiring a current time based on Real Time Clock (RTC) at a first time interval;
determining the current time as the content to be updated; and
determining an update information format corresponding to time as the target update information format.

11. The apparatus of claim 10, wherein the processor is further configured such that generating, based on the content to be updated and the target update information format, update information corresponding to the content to be updated comprises:
generating, based on the current time and the target update information format, the update information, wherein the update information includes at least one of time-displaying position information, time-displaying color information, and time format information, so that the screen is controlled based on the update information to update a currently displayed time.

12. The apparatus of claim 9, wherein the processor is further configured such that determining the target update information format corresponding to the type of the content to be updated comprises:
acquiring a prompting picture corresponding to a notification message when the notification message is received, wherein the notification message includes at least one of an incoming call notification message, a short message notification message and an instant communication notification message;
determining the prompting picture as the content to be updated; and
determining an update information format corresponding to picture as the target update information format.

13. The apparatus of claim 12, wherein the processor is further configured such that generating, based on the content to be updated and the target update information format, update information corresponding to the content to be updated comprises:
generating, based on the prompting picture and the target update information format, the update information, wherein the update information includes at least one of picture-displaying position information, picture size information, and picture format information, so that the screen is controlled based on the update information to update a currently displayed picture.

14. The apparatus of claim 9, wherein the processor is further configured to:
prior to entering the AOD mode, send initial information to a display module, wherein the initial information includes an initial time and character bitmap information, and the character bitmap information includes at least one of a font size, a code, bitmap data, and a color corresponding to the character, so that in the AOD mode, the screen is controlled based on the character bitmap information, the initial time and a clock frequency generated by a crystal oscillator in the display module, to update a currently displayed time at a second time interval.

15. The apparatus of claim 14, wherein the processor is further configured such that determining the target update information format corresponding to the type of the content to be updated comprises:
acquiring current time based on RTC at a third time interval, wherein the third time interval is larger than the second time interval;
determining the current time as the content to be updated; and
determining an update information format corresponding to time as the target update information format,
wherein generating, based on the content to be updated and the target update information format, update information corresponding to the content to be updated comprises:
generating, based on the current time and the target update information format, the update information, wherein the update information includes at least one of time-displaying position information, time-displaying color information, and time format information, so that the screen is controlled based on the update information to update a currently displayed time.

16. The apparatus of claim 9, wherein the processor is further configured to:
in the AOD mode, control the screen to adjust, based on an adjusting instruction at a fourth time interval, a display position of a currently displayed content.

17. A non-transitory computer-readable medium storing instructions that, when executed by one or more processors of a computing device, cause the computing device to:
in an Always On Display (AOD) mode, determine a target update information format corresponding to a type of a content to be updated, wherein the type of the content to be updated includes time and/or picture, and different update information formats correspond to different types of contents to be updated, wherein the update information format corresponding to the time includes expressive formats of time-displaying position, time-displaying color, current time, time format, and time period, and wherein the update information format corresponding to the picture includes expressive formats of picture-displaying position, picture size, and picture format;

generate, based on a predefined mapping relationship between the type content to be updated and the target update information format, only update information corresponding to the content to be updated; and control a screen to update the content to be updated based on the update information and to display the updated content while maintaining a display of unchanged contents.

\* \* \* \* \*